(12) United States Patent
Teepe

(10) Patent No.: US 12,496,451 B2
(45) Date of Patent: Dec. 16, 2025

(54) SELF-SUFFICIENT CARDIAC PACEMAKER

(71) Applicant: CELTRO GMBH, Dresden (DE)

(72) Inventor: Gerd Teepe, Dresden (DE)

(73) Assignee: CELTRO GMBH, Dresden (DE)

( * ) Notice: Subject to any disclaimer, the term of this patent is extended or adjusted under 35 U.S.C. 154(b) by 760 days.

(21) Appl. No.: 17/773,939

(22) PCT Filed: Nov. 3, 2020

(86) PCT No.: PCT/EP2020/080792
§ 371 (c)(1),
(2) Date: May 3, 2022

(87) PCT Pub. No.: WO2021/089531
PCT Pub. Date: May 14, 2021

(65) Prior Publication Data
US 2022/0379128 A1    Dec. 1, 2022

(30) Foreign Application Priority Data

Nov. 4, 2019   (EP) .................................... 19206852

(51) Int. Cl.
*H02J 50/00*  (2016.01)
*A61M 37/00*  (2006.01)
(Continued)

(52) U.S. Cl.
CPC ..... *A61N 1/37512* (2017.08); *A61M 37/0015* (2013.01); *A61N 1/362* (2013.01);
(Continued)

(58) Field of Classification Search
CPC ................ A61N 1/37512; A61N 1/362; A61N 1/37235; A61N 1/3785; H02J 50/10;
(Continued)

(56) References Cited

U.S. PATENT DOCUMENTS

2010/0076517 A1*  3/2010  Imran ................. A61N 1/3785
607/35

FOREIGN PATENT DOCUMENTS

WO    WO-2007149462 A2 *  12/2007  ........... A61N 1/3785
WO    WO-2010029297 A1 *   3/2010  ........... A61N 5/0601

OTHER PUBLICATIONS

Hannan, M.A., Mutashar, S., Samad, S.A. et al. Energy harvesting for the implantable biomedical devices: issues and challenges. BioMed Eng OnLine 13, 79 (2014). https://doi.org/10.1186/1475-925X-13-79 (24 pages).

* cited by examiner

*Primary Examiner* — Carl H Layno
*Assistant Examiner* — Aya Ziad Bakkar
(74) *Attorney, Agent, or Firm* — Olson & Cepuritis, Ltd.

(57) ABSTRACT

The invention discloses a cardiac pacemaker, characterized in that the cardiac pacemaker comprises a multiple of microneedles and a chip comprising at least one comparator with adaptive level, sequence control circuit, at least one capacitor stack built by n capacitors and 2n switches, at least one buffer capacitor outside the at least one capacitor stack, at least two additional switches outside the at least one capacitor stack, a CMOS-Logic, wherein further, the cardiac pacemaker comprises an interposer layer comprising holes for the multiple of microneedles and a lid. The cardiac pacemaker is characterized in that the chip, is located on one surface of the interposer layer and that the lid and the interposer layer form a capsule for the chip. Further, each microneedle of the array of microneedles has a distal end which protrudes from the chip and the cardiac pacemaker is adapted to be electrically self-sufficient.

20 Claims, 6 Drawing Sheets

(51) Int. Cl.
*A61N 1/362* (2006.01)
*A61N 1/372* (2006.01)
*A61N 1/375* (2006.01)
*A61N 1/378* (2006.01)
*H02J 7/00* (2006.01)
*H02J 7/34* (2006.01)
*H02J 50/10* (2016.01)

(52) U.S. Cl.
CPC ....... *A61N 1/37235* (2013.01); *A61N 1/3785* (2013.01); *H02J 7/0013* (2013.01); *H02J 7/345* (2013.01); *H02J 50/001* (2020.01); *H02J 50/10* (2016.02); *H02J 2207/50* (2020.01); *H02J 2310/23* (2020.01)

(58) Field of Classification Search
CPC ...... H02J 50/001; H02J 7/345; H02J 2310/23; H02J 2207/50; A61M 37/0015
See application file for complete search history.

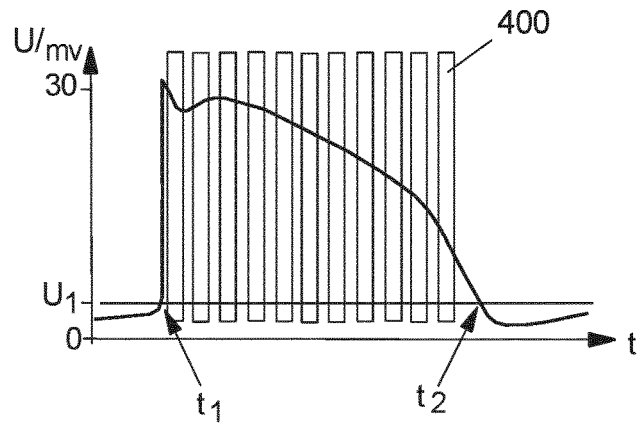
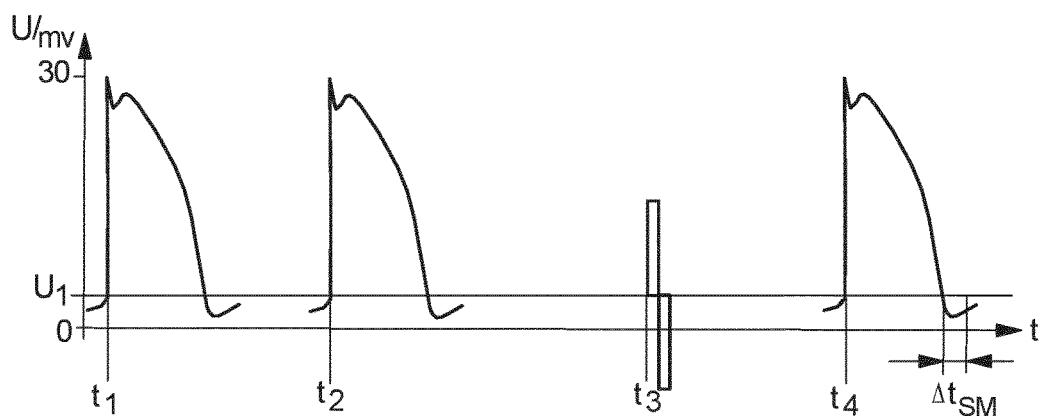
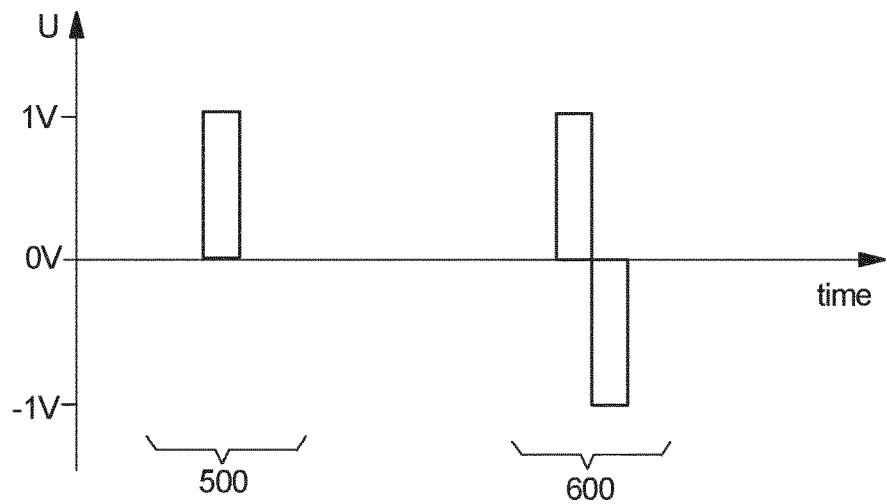

SELF-SUFFICIENT CARDIAC PACEMAKER

CROSS-REFERENCE TO RELATED APPLICATIONS

This application is a U.S. National Stage of PCT/EP2020/080792, filed Nov. 3, 2020, claiming priority to EP Application Serial No. 19206852.6 filed Nov. 4, 2019, both of which are incorporated herein by reference.

The invention discloses a cardiac pacemaker, characterized in that the cardiac pacemaker comprises a multiple of microneedles and a chip comprising at least one comparator with adaptive level, sequence control circuit, at least one capacitor stack built by n capacitors and 2n switches, at least one buffer capacitor outside the at least one capacitor stack, at least two additional switches outside the at least one capacitor stack, a CMOS-Logic, wherein further, the cardiac pacemaker comprises an interposer layer comprising holes for the multiple of microneedles and a lid. The cardiac pacemaker is characterized in that the chip, is located on one surface of the interposer layer and that the lid and the interposer layer form a capsule for the chip. Further, each microneedle of the array of microneedles has a distal end which protrudes from the chip and the cardiac pacemaker is adapted to be electrically self-sufficient.

Cardiac pacemaker therapy has been developed to treat patients with abnormalities of cardiac electrical impulse generation and propagation which lead to abnormal heart rate slowing or even cardiac standstill. Patients symptoms include dizziness, impaired exercise capacity, shortness of breath, fainting and sudden cardiac death.

Cardiac pacemaker technology has been introduced more than 50 years ago and has undergone a significant technological evolution. This was driven by progress in semiconductor, lead and battery technology, resulting in smaller devices, multi-chamber devices (dual and triple chamber pacemaker) and devices with improved physiological stimulation algorithms.

Today's pacemakers typically have a diameter size of several centimeters and are placed outside of the heart (typically under the left or right shoulder). Leads (typical length of 50 cm) connect from the pacemaker into the heart, where they are fixated and electrically attached to the cardiac muscle. One or more leads allows for 1 to 4 separate electrical connections into the cardiac tissue. Leads consist of electrical wires coated with bio-compatible material. Over time these leads are ingrown by connective tissue. Recently smaller pacemaker electronics have been developed to be placed directly into the heart. These devices do not need a lead. They have only one electrical connection into the myocardial tissue.

Further, cardiac pacemakers which are positioned inside the heart are known, e.g. Micra by Medtronic GmbH. Such cardiac pacemakers are implanted inside the cardiac tissue and are powered by a battery, wherein electronic components and battery are inside a capsule. The pacemaker is electrically connected to the cardiac tissue via a single contact, which also functions as an electrode. Thereby, the single contact is made by hook fixation.

Until today all pacemakers are powered by a built-in chemical battery and therefore need repetitive device replacements (every 8 to 10 years) over a patient's lifetime. This requires surgery with associated risks. Another option is to recharge the battery. Conventional recharging systems use for example magnetic induction (U.S. Pat. No. 3,867,950 A1) or solar cells (US 2009326597 AA). These systems suffer from the fact that additional technical devices outside the patient's body must be used to charge the pacemaker, which still makes it necessary to check the pacemaker's performance status and perform a battery charging procedure either by a technician or by the patient if necessary. A procedure which is usually unfavorable for the patient.

Overall today's clinical estimates indicate an 8 to 10% lifetime risk of pacemaker complications largely driven by long-term performance issues of leads and batteries. Pacemaker infection and multiple dysfunctional leads with subsequent vessel occlusion are among the most serious ones. The prevalence is increasing, especially in patients with long-term pacemaker therapy. Surgery for servicing implants is associated with a measurable risk of death.

Therefore, it is the purpose of the invention to overcome the above mentioned disadvantages of the state of the art and to provide a cardiac pacemaker which is electrically self-sufficient and therefore does not need a recharge procedure for a battery or even a whole replacement by a new one due to an empty battery. Further, leads which connect the pacemaker with the hart should be avoided to reduce long-term performance issues like pacemaker infections or multiple dysfunctional leads with subsequent vessel occlusion.

Therefore, the present invention provides a cardiac pacemaker, characterized in that the cardiac pacemaker comprises
- a multiple of microneedles forming an array of microneedles;
- a chip comprising at least one comparator with adaptive level, a sequence control circuit, at least one capacitor stack built by n capacitors and 2n switches, at least one buffer capacitor outside the at least one capacitor stack, at least two additional switches outside the at least one capacitor stack and a CMOS-Logic, wherein $n \in \mathbb{N}$;
- an interposer layer comprising holes for the multiple of microneedles;
- a lid;
- at least one coil;
- wherein the chip, is located on one surface of the interposer layer;
- wherein the lid and the interposer layer form a capsule for the chip and the at least one coil;
- wherein each microneedle has a distal end which protrudes from the chip; and
- wherein the cardiac pacemaker is adapted to be electrically self-sufficient due to harvesting of electrical energy from myocardial cells.

Further, the present invention provides a method for stimulating biological tissue utilizing a cardiac pacemaker according to any of claims 1 to 11, characterized in that
- the microneedles of the array of microneedles are inserted into myocardial tissue;
- a cardiac cycle time is set;
- optionally a minimum cardiac cycle time is set;
- at least one reference level for the cellular electrical activity is set;
- at least one microneedle of the array of microneedles is set to emit an electrical pulse;
- at least one microneedle of the array of microneedles is set to sense the amplitude of the cellular electrical activity and to harvest energy;
- the amplitude of the cellular electrical activity is sensed and energy is harvested at least by one microneedle;
- the cardiac cycle time starts if the amplitude of the cellular electrical activity sensed by at least one microneedle of the array of microneedles reaches the reference level of the corresponding microneedle of the array of microneedles or after a pulse is emitted into the myocardial tissue by at least one microneedle of the array of microneedles; and an electrical pulse is applied to the myocardial tissue by at least one microneedle of the array of microneedles if no cellular electrical activity with an amplitude above the reference level is sensed anymore during the cardiac cycle time after the amplitude of the sensed cellular electrical activity has been fallen below the reference level;

wherein the electrical pulse is generated utilizing the harvested energy.

SUMMARY OF THE INVENTION

Device Configuration

The cardiac pacemaker according to the invention comprises a multiple of microneedles which form an array of microneedles. Every microneedle of the array of microneedles has a proximal and a distal end. In one embodiment of the invention, the microneedle according to the invention has a proximal end, which is shaped cylindrical with a diameter between 0.05 mm and 0.5 mm, preferably the proximal end has a diameter of 0.2 mm and a height between 0.05 mm and 0.5 mm, preferably with a height of 0.2 mm.

In a further embodiment of the invention the microneedle according to the invention has a proximal end which is shaped like a cuboid with a width and depth between 0.05 mm and 0.5 mm, preferably the width and depth of the cuboid is 0.2 mm. The height of the cuboid is between 0.05 mm and 0.5 mm, preferably the cuboid has a height of 0.2 mm.

From the proximal end, the microneedle comprises a tapered portion which connects a distal end with the proximal end. The distal end is needle shaped and has a length between 0.5 mm and 2.0 mm. The distal end of the microneedle is electrically conductive and shear stress resistant in the range of 5 to 50 Newton, which is comparable to the shear stress resistance of bonding wires. Preferably the microneedle is milled from one piece.

Preferably, the diameters of the distal ends of the multiple of microneedles are between 0,001 mm and 0.1 mm, preferably between 0.01 mm and 0.1 mm, most preferably the diameters of the distal ends of the multiple of microneedles are 0.02 mm. Thereby, the distal ends of the microneedles approximate myocardial cellular dimensions. The dimensions of the microneedles are therefore a lot smaller than any other electrodes in use today.

The small dimensions of the microneedles offer several advantages over the state of the art. Firstly, microneedles according to the invention couple directly electrically to heart muscle cells. Thereby, one microneedle is in direct electrical contact with about 100 heart muscle cells.

Hence, the electrical signals of the microneedles according to the invention are near-field signals and are similar in form to the action potential of the heart muscle cell. Further, microneedles according to the invention are able to sense cellular electrical activity, harvest energy directly from inside the myocardial tissue and/or emit an electrical pulse directly into the myocardial tissue due to their small dimensions. Thereby, advantageously the stimulation threshold is lowered and the medical signal interpretation becomes clearer and more unambiguous. State of the art devices are not suitable for this purpose, since electrical signals of conventional electrodes are far-field signals, as the electrodes "float" above the tissue. In a preferred embodiment of the invention each microneedle of the array of microneedles has the same shape and dimension.

In a preferred embodiment of the invention the cardiac pacemaker comprises between 5 and 10000 microneedles, preferably between 25 and 1000 microneedles, most preferably between 100 and 250 microneedles.

Principally the multiple of microneedles can be arranged on the chip in every way. In a preferred embodiment of the invention, the multiple of microneedles is arranged symmetrically to each other on the chip. Thereby, advantageously a largest possible number of microneedles can be arranged on the surface of the chip. Further, the regularity in the order of the microneedles simplifies production processes.

The microneedles comprise a material of the group comprising Platin/Iridium (PtIr), gold, and fine metals. The material of the microneedles should be suitable for solder-connection with the chip or the interposer layer. Further, according to the invention, all materials comprised in the multiple of microneedles are bio-compatible and insensitive to body liquids. Bio-compatible in conjunction with the present invention means that no toxic interactions occur between the bio-compatible material and tissue, e.g. human tissue.

Further, preferably, each microneedle is adapted to be able to harvest cellular energy, to electrically stimulate live tissue and to sense intrinsic cellular electrical activity. According to the invention, every microneedle of the multiple of microneedles is operable independent of the other microneedles. Which means that one microneedle could harvest energy while a neighboring microneedle is sensing intrinsic cellular electrical activity. The tasks of each microneedles can be redistributed at any time and thus adapted to the current requirements of the cardiac pacemaker.

Further, the cardiac pacemaker according to the invention comprises a chip and an interposer layer. In one embodiment of the invention the proximal end of each microneedle is soldered to the surface of the chip, which ensures that each microneedle of the array of a multiple of microneedles has a direct contact to the chip. In a further embodiment of the invention the proximal end of each microneedle is soldered to the surface of the interposer layer of the cardiac pacemaker. According to the invention each microneedle of the array of a multiple of microneedles is isolated from each other microneedle of the array of a multiple of microneedles. Further, the distal end of every microneedle protrudes from the chip and/or the interposer layer.

According to the invention the chip comprises all devices necessary to control the cardiac pacemaker's functions. Therefore, the chip comprises at least one comparator with adaptive level, a sequence control circuit, at least one capacitor stack built by n capacitors and 2n switches, at least one buffer capacitor outside the at least one capacitor stack, at least two additional switches outside the at least one capacitor stack and a CMOS-Logic, wherein $n \in \mathbb{N}$.

Self-Sufficiency Energy Harvesting

In a preferred embodiment of the invention the chip comprises at least one comparator with adaptive level, at least one capacitor stack built by n capacitors and 2n switches, at least one buffer capacitor outside the at least one capacitor stack, at least two additional switches outside the at least one capacitor stack for each needle of the array of microneedles.

According to the invention the 2n switches of the at least one capacitor stack couple the n capacitors selectively to at least one microneedle of the array of microneedles. Further, the n capacitors of the at least one capacitor stack are dedicated to be sequentially charged by at least one microneedle of the array of microneedles one after the other. And the at least one buffer capacitor outside the at least one capacitor stack is dedicated to be charged from the n capacitors of the capacitor stack at once.

Hence, the chip according to the invention comprises at least one capacitor stack, wherein the capacitor stack is built by n capacitors and 2n switches, wherein n∈N. The capacitor stack can comprise as much capacitors as can be accommodated constructively. In one embodiment of the invention n is between 2 and 20, more preferably between 2 and 14. The n capacitors of the capacitors stack are dedicated to be sequentially charged by at least one microneedle of the array of microneedles, which functions as DC input source, one after the other.

The 2n switches of the capacitor stack couple the n capacitors selectively to at least one microneedle of the array of microneedles in a way that every capacitor is sequentially charged by the DC input made available by the at least one microneedle of the array of microneedles one after the other. The DC input is made available since the microneedles couple directly electrically to heart muscle cells and derive the electrical signal. The controlling and sequencing of the switches is generated from a usual CMOS-Logic, which is common to Microelectronics.

At least one buffer capacitor is situated outside the capacitor stack, which works as a buffer. According to the invention, the at least one buffer capacitor is dedicated to be charged from the n capacitors of the at least one capacitor stack at once. In a preferred embodiment of the invention, the chip comprises one buffer capacitor outside the capacitor stack. In a further preferred embodiment of the invention the chip comprises two buffer capacitors outside the capacitor stack.

Furthermore, the chip comprises at least two additional switches outside the capacitor stack. In a preferred embodiment of the invention the chip comprises two additional switches outside the capacitor stack. The additional switches are dedicated to selectively couple the capacitor stack to the at least one buffer capacitor outside the capacitor stack or to a further optional capacitor stack.

In a further preferred embodiment the chip comprises four additional switches outside the capacitor stack. Preferably the chip comprises four additional switches outside the at least one capacitor stack if the chip comprises a first buffer capacitor outside the at least one capacitor stack and a second buffer capacitor outside the at least one capacitor stack. In this embodiment two additional switches are dedicated to selectively connect the at least one capacitor stack to the first buffer capacitor outside the capacitor stack and the two further additional switches are dedicated to selectively connect the at least one capacitor stack to the second buffer capacitor outside the capacitor stack.

Accordingly, in one preferred embodiment the chip according to the invention comprises two buffer capacitors outside the capacitor stack as buffer capacitors outside the at least one capacitor stack and four additional switch outside the at least one capacitor stack.

From its physical construction as a stack, then capacitors of the capacitor stack are all connected in series electrically. Furthermore, in one embodiment of the invention, the at least one capacitor stack comprises at least three conductive plates wherein the conductive plates have a top-side and a bottom-side and wherein the top-side of at least one conductive plate is part of a first capacitor and the bottom-side of the at least one conductive plate is part of a neighboring further capacitor. Furthermore, the capacitor stack comprises an isolating material between the conductive plates in a way that a capacitor is built.

In a preferred embodiment of the invention, a capacitor stack with n capacitors comprises m=n+1 conductive plates. According to the invention the first conductor n=1 is built between the bottom-side of the first conductive plate (m=1) and the top-side of the second conductive plate (m=2). The neighboring conductor (n=2) is built between the bottom-side of the second conductive plate (m=2) and the top-side of the third conductive plate (m=3) and so on.

The capacitance of the capacitors built according to the invention is quite wide ranging from 1 nF down to 1 fF and even below. It depends on plate geometries and the dielectric material employed between the plates. Typical dielectric materials are $SiO_2$ or plastic, but other dielectric materials are possible.

The arrangement of the conductors in a capacitor stack with n capacitors according to the invention has the advantage that the inner conductive plates, which means plates m=2 to m=n form no or just very small parasitic capacitances to the outside of the stack. Parasitic capacitances are well known in the art. They arise at the interfaces of capacitors to the surrounding and are unwanted as those have to be charged at every charge cycle of the capacitor. This process lowers the charging efficiency of the capacitor and therefore its end-charging voltage. Accordingly, in the state of the art every capacitor has two interfaces to the surrounding and therefore two interfaces where parasitic capacitances arise.

The capacitor stack according to the invention is able to provide n capacitors, wherein only the first and the last capacitor have a substantial interface to the surrounding. Therefore, advantageously, only at these two interfaces parasitic capacitances will form. Accordingly, the charging efficiency of the n capacitors of the capacitor stack is increased as well as the end-charging voltage.

Furthermore, in a preferred embodiment of the invention, all capacitors are connected in series electrically.

In one preferred embodiment of the invention the at least one capacitor stack built by n capacitors and 2n switches, the at least one buffer capacitor outside the at least one capacitor stack and the at least two additional switches outside the at least one capacitor stack are configured as an integrated circuit wherein switches are realized as transistors and capacitors are realized by conductive plates from integrated circuit technology.

Preferably the conductive plates are made of material selected from the group comprising metal or polysilicon or any other conductive material from integrated circuit technology. Suitable metals are copper and aluminum and tungsten.

In one embodiment of the invention the isolating material is selected from the group comprising $SiO_2$, SiN and $Hf_2O$ and stacks thereof.

As described above the capacitor stack is internally nearly perfect if it comes to storing the applied charges, as the field is nicely confined internally. Unfortunately at the first and last conductive plates still some parasitic capacitances will form. In view not to lose the energy stored in those external parasitic capacitances, according to the invention, an inductor can be applied to perform intermediate storage in a resonant circuit configuration.

Accordingly, in one embodiment of the invention the chip comprises additionally an inductor. Preferably small inductors are integrated monolithically in the integrated circuit. According to the invention the switching frequency is chosen high enough so that the resonant frequency of the parasitic capacitor and the inductivity equals the inverse of the total charging/discharging cycle time of the capacitor stack. In addition the charging/discharging timing of the capacitor stack should be adapted such that a sine-curve is approximated.

Practical inductivity values in integrated circuits will be in the range 1-10 µH when 100 windings will wrap around a typical chip of 25 mm² size. Parasitic capacitor values will range between 1-10 pF for a typical capacitor stack. For this setting, the resonance frequencies will be found between 10-200 MHz. The charging frequencies of the capacitances in the capacitor stack in consequence will have to be 2n higher.

In another preferred embodiment the chip comprises several capacitor stacks wherein every capacitor stack is dedicated to charge another capacitor stack and one capacitor stack is dedicated to charge at least one buffer capacitor outsides the capacitor stacks. Thereby, cascading of the sequential small charge collection according to the invention is possible.

Several capacitor stacks are preferably connected by switches outside the capacitor stacks, most preferably always two capacitor stacks are connected by two switches outside the capacitor stacks. In one embodiment of the invention the device comprises x capacitor stacks and 2× switches outside the capacitor stacks, wherein x∈N. In one embodiment of the invention the device comprises 1 to 20 capacitor stacks, preferably 5 to 15, most preferably 13 to 15, as this is within the capabilities of current semiconductor production technologies.

However, the charging frequency of a further capacitor stack is n-times slower than the charging frequency of the first capacitor stack (with n being the number of capacitors in the first capacitor stack). In principle the n capacitors of the first capacitor stack are charged by the DC input of at least one microneedle of the array of microneedles one after the other. Afterwards the n capacitors of the first capacitor stack are discharged at once to one capacitor of a further capacitor stack. In case the further capacitor stack is built by k capacitors, k charging cycles are needed to charge the k capacitors of the further capacitor stack one after the other, wherein k∈N. If all capacitors of the further capacitor stack are charged they are discharged to a further capacitor outside the capacitor stack at once. In total, the entire discharge occurs at a frequency k·n lower than the charging frequency of the first capacitor stack. The maximum voltage of the second stack is k n the feeding voltage of the DC input source. For example with 10 mV at the at least one microneedle of the array of microneedles, and 10 capacitors on each capacitors stack, 1 V can be realized as output at maximum.

According to the invention, every further capacitor stack is dedicated to be fed by positive or negative voltages from another capacitor stack. Therefore, the switches outside the capacitor stacks connecting the capacitor stacks have to be sequenced accordingly. If the first capacitor stack provides positive or negative charge, charging of the second capacitor stack has to be done accordingly.

In an embodiment of the invention the sequencing of the switches is generated from a usual CMOS-Logic, which is common to Microelectronics. For the CMOS-logic to function, voltages of a few hundred millivolts are required. Typical state of the art semiconductor technology operates at around 1 Volt or slightly below. Since the cardiac pacemaker according to the invention collects energy starting with a few millivolts at the source, this voltage is too low to operate the CMOS-logic.

Startup Circuit

However, after collection and cascading, voltages in the 1-Volt domain can be obtained, which is enough to operate the CMOS-logic. For this reason, a startup circuit is required, to make sure the logic can be powered and the switches are operated to perform energy collection from the tiny sources.

For this, a magnetic coupling over coils is proposed. The outer coil is excited with alternate current, creating a magnetic alternating field. Through this field the startup energy is transmitted to the coil on the integrated circuit, which recuperates the startup energy.

According to the invention the cardiac pacemaker comprises at least one coil. Preferably the coil is dedicated to receive a startup energy by magnetic coupling with another coil. In one embodiment the at least one coil is located on the interposer layer. In a further embodiment of the invention the at least one coil is part of the chip in the sense that the at least one coil is wound around the chip. However, in each of these embodiments the chip comprises an interface for power management to connect the at least one coil of the cardiac pacemaker to the CMOS-logic comprised on the chip.

In one embodiment of the invention the cardiac pacemaker comprises at least one further capacitor. The at least one further capacitor can be comprised on the chip or can be located on the interposer layer outside the chip. The at least one further capacitor of the cardiac pacemaker serves preferably as buffer capacitor for all microneedles of the array of microneedles and the capacitor stacks assigned to them. Furthermore, the at least one further capacitor of the cardiac pacemaker can serve for energy transfer from an external energy source, e.g. for the startup process. In one embodiment the at least one further capacitor is connected to the chip by the interface for power management comprised on the chip.

Programmability

Further, the chip of the cardiac pacemaker according to the invention is adapted to communicate with an external programmer unit. External means that the unit must not be in direct contact with the patient at all. The communication is preferably done via externally applied electromagnetic fields. Accordingly, in one embodiment the cardiac pacemaker further comprises at least one coil to communicate with the external programmer unit, thereby the coil functions as receiver and transmitter. Furthermore, the chip comprises an I/O interface for data transmission from the external programmer unit via the coil of the cardiac pacemaker to the chip. This has the advantage, that the functionality of the cardiac pacemaker can be proofed, surveyed and adjusted from the external programmer unit. Hence, adjustments in the functionality of the cardiac pacemaker are possible through the tissue and without physical contact to the cardiac pacemaker. Accordingly in a preferred embodiment of the invention the cardiac pacemaker further comprises an external programmer unit. The external programmer unit is selected from a group comprising tablets, smartphones and PC's. The external programmer unit is adapted to communicate with the cardiac pacemaker, therefore in a preferred embodiment a coil for transmitting and receiving is comprised in the external programmer unit.

Accordingly in one embodiment of the invention the cardiac pacemaker comprises at least two coils, wherein one coil is adapted to receive a startup energy for the CMOS-logic and one coil is adapted to function as receiver and transmitter to the external programmer unit. Both coils can be located on the interposer layer or can wound around the chip as already described. In another embodiment one coil can be located on the interposer layer and another coil can be wound around the chip.

Advantageously, in a preferred embodiment the coil which is comprised in the cardiac pacemaker and uses to communicate with the external programmer unit and the coil which is comprised in the cardiac pacemaker and used to receive a startup energy for the CMOS-Logic are the same coil.

Interposer Layer

Further the cardiac pacemaker according to the invention comprises an interposer layer and a lid.

The interposer layer serves as assembly platform for the chip and comprises a material of the group comprising FR4 materials, epoxy-resin, Poly(methyl methacrylate) (PMMA), ceramics, silicon dioxide ($SiO_2$), glass and plastics. FR4 materials are a class of flame resistant composite materials comprising woven fiberglass and epoxy resin. Principally, the materials comprised in the interposer layer have to be non-electrically conductive. Further, according to the invention all materials comprised in the interposer layer are bio-compatible and insensitive to body liquids.

In one embodiment of the invention the interposer layer comprises holes, each hole being suitable for the distal end of a microneedle to pass through. According to the invention the interposer layer comprises a hole for each microneedle of the array of microneedles. Thus, in a preferred embodiment the interposer layer comprises as many holes as the array of a multiple of microneedles comprises microneedles. In this embodiment the microneedles are soldered to a surface of the chip.

The chip is positioned on top of the interposer layer and the microneedles of the array of a multiple of microneedles pass through the holes in the interposer layer. Hence, every microneedle of the array of microneedles passes through a separate hole in the interposer layer. Advantageously, the holes in the interposer layer are arranged in a way that all microneedles of the array of a multiple of microneedles which are soldered to the chip can pass through without making contact to the interposer layer.

Every hole in the interposer layer with a microneedle passing through is sealed to the surrounding with a non-conductive material. Suitable non-conductive materials are for example epoxy-resin, Poly(methyl methacrylate) (PMMA), glass and plastics. Thereby, no fluids from the environment can penetrate to the chip through the holes.

In a further embodiment each microneedle of the array of microneedles is soldered to the interposer layer. In this embodiment the interposer layer comprises a wiring connecting each microneedle of the array of microneedles to the chip, thereby connecting each microneedle of the array of microneedles to at least one capacitor stack.

In one embodiment the cardiac pacemaker further comprises at least one further capacitor and/or at least one sensor. In this embodiment the interposer layer comprises a wiring connecting the chip, the at least one senor and the at least one further capacitor with each other.

Further, in one embodiment the interposer layer serves as assembly platform for the at least one further capacitor and/or the at least one sensor and/or the at least one coil of the cardiac pacemaker. In this embodiment the at least one further capacitor and/or the at least one sensor and/or the at least one coil are preferably positioned next to the chip on the interposer layer.

According to the invention the cardiac pacemaker further comprises a lid. The lid covers the chip from the surrounding, wherein the lid is sealed to the interposer layer. Sealing can be done by adhesives or soldering tin. If adhesives are used the adhesive should be hardened. However, the sealing should be bio-compatible and insensitive to body fluids. Accordingly, the lid and the interposer layer form a capsule for the chip. The lid and the interposer layer shield the electronic parts from surrounding body-fluids like blood, e.g. from body fluids by forming a capsule.

In one embodiment of the invention next to the chip on top of the interposer layer at least one sensor and/or at least one capacitor and/or at least one coil are positioned. The chip, the at least one sensor and/or the at least one capacitor and/or the at least one coil are located on one surface of the interposer layer and the lid covers the chip, the at least one sensor and/or the at least one capacitor and/or the at least one coil from the surrounding, wherein the lid is sealed to the interposer layer, as already described. Thereby, the lid and the interposer layer form a capsule for the chip, the at least one sensor and/or the at least one capacitor and/or the at least one coil. Preferably, the lid and the interposer layer shield all electronic parts comprised in the cardiac pacemaker from surrounding body-fluids like blood, e.g. from body fluids by forming a capsule.

The lid comprises a material of the group comprising silicon and metals. Suitable metals are for example aluminum, or aluminum vaporised with tungsten. According to the invention all materials comprised in the lid are bio-compatible and insensitive to body liquids.

The interposer layer further comprises at least two fixing holes outside the lid. Advantageously, a fixing hole is positioned outside the lid on each side of the lid in the interposer layer. The fixing holes are suited to serve for the fixation of the cardiac pacemaker into myocardial tissue. The cardiac pacemaker can be fixated by screws, clamps or such like devices through the fixing holes in the interposer layer outside the lid.

In one embodiment of the invention the cardiac pacemaker further comprises at least one sensor. In a preferred embodiment of the invention the sensor is an activity sensor. The activity sensor may include an accelerometer, such as an electrostatical accelerometer, a piezoceramic accelerometer or a MEMS-based micromechanical accelerometer, that typically provides a sensor output that varies as a function of a measured parameter relating to a patients metabolic requirements. In other words, activity sensors detect motion of the patient that accompanies physical activity, and may adjust the pacing rate to the metabolic needs associated with the physical activity. In addition, the activity sensor may be configured to detect a change in the posture of a patient. If the cardiac pacemaker comprises at least one sensor the chip of the cardiac pacemaker comprises a sensor interface to connect the sensor with the chip.

In a preferred embodiment of the invention the cardiac pacemaker comprises a MEMS-based three-vector activity sensor.

The cardiac pacemaker according to the invention is between 1 mm and 5 cm long, between 1 mm and 5 mm wide and between 3 mm and 10 mm high. Thereby, the cardiac pacemaker according to the invention is smaller than any currently available cardiac pacemaker. This offers several advantages, first of all a cardiac pacemaker of this size can be implanted more easily as it allows easier access via the vein. Due to its small dimensions the cardiac pacemaker according to the invention grows better into the tissue, is less susceptible to infections and is less prone to heart perforations.

Since the cardiac pacemaker according to the invention is adapted to sense cellular electrical activity and to generate an electrical pulse if necessary, the cardiac pacemaker according to the invention provides all functions that are required by a cardiac pacemaker. Advantageously, the cardiac pacemaker according to the invention is adapted to be electrically self-sufficient.

According to the invention, the chip comprises a sequence control circuit. This circuit controls the functionality of the cardiac pacemaker and determines the workflow of the functions of the cardiac pacemaker. All interfaces comprised on the chip like I/O-interface, sensor interface and interface for power management are interfaces to the sequence control circuit.

Sensing

Sensing of cellular electrical activity requires measurement of the amplitude of the actual potential with regards to a reference level or ground. Generally, this is performed with a comparator circuit. For cardiac pacemakers it is important to know the timing of the expected/intended heartbeat. The measurement of the myocardial potential is standard and in use with current cardiac pacemakers.

According to the invention, the chip comprises at least one comparator with adaptive reference level. In a preferred embodiment of the invention the chip comprises a comparator with adaptive reference level for each microneedle of the array of microneedles, wherein each microneedle of the array of microneedles is electrically connected to one comparator circuit on the chip.

According to the invention, every microneedle of the array of microneedles is adapted to be able to sense the amplitude of the intrinsic cellular electrical activity by the standard procedure of measurement of myocardial potential. Advantageously, these measurements can be performed on one microneedle of the array of microneedles, on selected microneedles of the array of microneedles or on all of the microneedles of the array of microneedles. The redundancy of microneedles in the array of microneedles provides a number of beneficial features. How many and which of the microneedles of the array of microneedles perform sensing is programmed via the external programmer unit.

In one embodiment the cellular electrical activity is sensed continuously. In a further embodiment of the invention the cellular electrical activity is sensed in a way that it is monitored when the amplitude of the cellular electrical activity exceeds the reference level, when the amplitude of the cellular electrical activity falls below the reference level and what the maximum amplitude of the cellular electrical activity during a heart cycle is. Thereby, timing points of the individual progression of the heartbeat are monitored. Further, the amplitude of the cellular electrical activity is sensed by at least one microneedle of the array of microneedles and recorded by the external programmer unit or in one embodiment by an internal data memory device, which is comprised in the cardiac pacemaker. In case the amplitude of the cellular electrical activity is recorded by an internal data memory device, the chip according to the invention further comprises a suited internal memory device.

Further, the amplitude of the actual myocardial potential sensed by the microneedles of the array of microneedles selected for sensing of cellular electrical activity is compared to a reference level by the at least one comparator. Principally the reference level for each comparator is programmable. In one embodiment of the invention a reference level is programmed individually for each microneedle of the array of microneedles. In a further embodiment of the invention, the reference level is the same for each comparator comprised on the chip. In one embodiment of the invention the reference level of the at least one comparator is programmable between 0.1 mV and 10.0 mV.

Hence, the reference level can be the same for all microneedles of the array of microneedles sensing the cellular electrical activity, but can also be different for each microneedle of the array of microneedles. By programming the reference level of each comparator individually, optimized timing points for all microneedles of the array of microneedles which are penetrating the tissue at different positions can be provided. This is very advantageously, since the timing of all functions of the cardiac pacemaker according to the invention can be programmed according to individual progression of the heartbeat. This increases on the one hand safety aspects, since the cellular electrical activity is sensed by several individual microneedles of the array of microneedles, which can be understood as sensing with several individual electrodes. If one microneedle of the array of microneedles does not function correctly another microneedle can be programmed to perform sensing function. Accordingly, sensing function is provided in a redundantly way. In contrast, in state of the art cardiac pacemakers only one electrode is provided for sensing cellular electrical activity. If this electrode does not function correctly, the pacemaker has to be replaced. Hence, the cardiac pacemaker according to the invention reduces the risk of new operations.

On the other hand, in one embodiment of the invention the amplitudes of the cellular electrical activity sensed by several microneedles of the array of microneedles are compared by the external programmer unit and/or by the sequence control circuit. Hence, electronic malfunctions/misinterpretations of the heart's own signal become less likely because permanently the signals of several microneedles of the array of microneedles are compared electronically.

Further, the efficiency of the cardiac pacemaker is increased compared to state of the art cardiac pacemakers, since the microneedles of the array of microneedles used for performing energy harvesting and/or sensing of cellular electrical energy and/or for emitting an electrical pulse can be selected depending on faultless function of the respective microneedles of the array of microneedles.

Due to the multiple microneedles sensing the cellular electrical energy independent from each other and which sense temporally and spatial aligned, the typical vulnerability of state-of-the-art cardiac pacemakers to electrical signal misinterpretation due to external electrical noise or electrical far-field signals is diminished.

Harvesting

According to the invention, every microneedle of the array of microneedles is adapted to harvest cellular energy. The heart is a big muscle and transforms chemical energy (sugar) into mechanical energy (heartbeats). This process is controlled and conducted through the spread of electrical energy over all myocardial cells. The left main chamber of the heart (left ventricle) contains a total of approximately 6 billion cells. Each cell acts as a battery which is discharged and charged once during each cardiac cycle. That function is mediated by the exchange of Sodium and Potassium through ion channels in the cellular membrane. The actual electrical energy turnover of an individual cell is small, however, harvesting from multiple cells and multiple times can collect a significant amount of electrical energy.

Even if the transmembrane voltages cannot be directly accessed, as the microneedles of the array of microneedles are too large to reach an individual intracellular space, portions of the produced cellular electrical energy are collectible from the outside intercellular space. As one microneedle of the array of microneedles touches a sequence of cells (approximately 100 cells) which operate synchronously, the collectable energy increases.

Harvesting is done by a method comprising at least one capacitor stack build by n capacitors and 2n switches, at least one buffer capacitor outside the capacitor stack, at least two additional switches and at least one microneedle of the array of microneedles as DC input source, comprising the steps
  a. the n capacitors of the capacitor stack are sequentially charged by coupling one capacitor after the other to at least one microneedle of the array of microneedles by selectively closing the switches;
  b. discharging the n capacitors of the capacitor stack into the at least one buffer capacitor outside the capacitor stack;
wherein the at least one microneedle of the array of microneedles couples directly electrically to heart muscle cells, thereby functioning as DC input source. Steps a. and b. define one harvesting cycle.

In a preferred embodiment of the method of the invention the n capacitors of the capacitor stack are sequentially charged one after the other in n charging cycles and the n capacitors of the capacitor stack are discharged in an $n+1^{st}$ cycle into at least one buffer capacitor outside the capacitor stack at once.

Fundamentally, the capacitors of a capacitor stack could be charged in any order. However, in order to reduce the recharging of the parasitic capacitances which arise at the interfaces to the surrounding, the following charging scheme is proposed. According to a preferred embodiment of the invention, the n capacitors of the capacitor stack are sequentially charged one after the other in n charging cycles, wherein the first capacitor is charged, afterwards the capacitor which is next to the first one is charged, afterwards the capacitor which is next to the one charged before is charged until all n capacitors are charged.

If all capacitors of a capacitor stack are charged, the capacitors of the capacitor stack are all discharged into at least one buffer capacitor outside the capacitor stack at once. This is done by selectively closing the switches of the capacitor stack and the switches outside the capacitor stack.

In a further embodiment of the invention a bipolar charging of the capacitor stack can be done. Fundamentally, each capacitor of a capacitor stack can be charged to positive or negative voltages, depending which plate of the capacitor is grounded. As already described, capacitors in the capacitor stack are being loaded sequentially. While one plate is grounded, the other plate is charged to a fraction of the input voltage. Which means, that capacitors in the capacitor stack above the currently grounded plate are pushed to positive voltages, whereas the plates below the currently grounded plate are pushed to negative voltages. Accordingly, the capacitors of the capacitor stack can be charged to positive or negative voltages, by closing the switches inside the capacitor stack in an appropriate manner, thereby selecting the grounded plate of the each capacitor in the capacitor stack.

If bipolar charging of the capacitor stack is done, preferably two buffer capacitors outside the capacitors stack are used as buffer capacitors. In this embodiment of the invention the at least one capacitor stack is first charged with positive voltages and after all capacitors in the capacitor stack are charged, all capacitors of the capacitor stack are discharged into the first buffer capacitor outside the capacitor stack. Afterwards the capacitors of the capacitor stack are charged with negative voltages and after all capacitors in the capacitor stack are charged all capacitors of the capacitor stack are discharged into the second buffer capacitor outside the capacitor stack.

Since parasitic capacitances which arise at the interfaces to the surrounding have also to be charged at each charging procedure, it is most advantageous to always charge neighboring capacitor and not to "jump around" between the capacitors in the capacitor stack. Therefore, if bipolar charging of the capacitor stack is done the capacitors of the capacitor stack are sequentially charged the n capacitors are discharged into a first buffer capacitor outside the capacitor stack, afterwards the n capacitors of the capacitor stack are sequentially charged in the reversed order and after the n capacitors are charged the n capacitors are discharged into a second buffer capacitor outside the capacitor stack.

Accordingly, in a preferred embodiment of the invention after the n capacitors of the capacitor stack are sequentially charged the n capacitors are discharged into a first buffer capacitor outside the capacitor stack, afterwards the n capacitors of the capacitor stack are sequentially charged in the reversed order and after the n capacitors are charged the n capacitors are discharged into a second buffer capacitor outside the capacitor stack.

According to the invention the n capacitors of a capacitor stack can be discharged at once into one capacitor of a further capacitor stack.

The charging sequence for the second capacitor stack is derived from the first stack and couples to its timing. Instead of discharging the first capacitor stack into a buffer capacitance, it is discharged into one of the capacitors forming the second capacitor stack. Fundamentally it could be any of capacitors of the second capacitor stack, but practically the charging of the second capacitor stack should follow the same method already described. Which means charging of the capacitors of a capacitor stack should be done by charging neighboring capacitors. As the second capacitor stack is also loaded with some parasitic capacitance to the outside, sequentially charging the second stack as described will keep the charge flown into the parasitic capacitances to a minimum at each step.

One of the embodiments of the discharge circuit is a bipolar setting. This allows the charging of the second capacitor stack with negative and positive charge depending on the sequence. When the negative charge is transferred to the second capacitor stack, care has to be taken that the transistor switches are operated such that the charge on the stack is added with reverse polarity, so that this charge is accumulated on the second stack and not subtracted.

Parallelizing the sequential charge collection according to the invention, energy collection is multiplied and therefore the output-power of the device is increased.

In one embodiment of the invention the cardiac pacemaker comprises at least one further capacitor. The further capacitor can serve as buffer capacitor for the harvested energy or for energy which is transferred from an external energy source.

In one embodiment of the invention the cardiac pacemaker is adapted to perform several harvesting cycles during a singular heartbeat in order to additionally optimize the harvested energy amount.

According to the invention energy harvesting can be done on one microneedle of the array of microneedles, on several microneedles of the array of microneedles or on all of the microneedles of the array of microneedles simultaneously.

Furthermore, in one embodiment of the invention a selection mechanism is implemented to select high yielding microneedles of the array of microneedles for energy harvesting and to discard low yielding microneedles of the array of microneedles. In one embodiment of the invention it is programmed which microneedles of the array of microneedles are utilized for energy harvesting. This is done via the external programmer unit. In a further embodiment of the invention the microneedles of the array of microneedles which are utilized for energy harvesting are selected due to the cellular electrical energy sensed by the individual microneedles of the array of microneedles. This is regulated internally by the sequence control circuit on the chip, advantageously no regulation by the external programmer unit is necessary. Thereby, the microneedles of the array of microneedles are selected for energy harvesting that achieve the highest energy yield.

According to the invention the cardiac pacemaker is adapted to be electrically self-sufficient due to harvesting of electrical energy from myocardial cells. Since the harvested energy is uses to operate all functions of the cardiac pacemaker, the cardiac pacemaker of the present invention is not dependent on a power supply from a battery, which means the cardiac pacemaker according to the invention is electrically self-sufficient, which means electrically autonomous. All disadvantages associated with battery operation are eliminated. Hence, there is no need for any kind of recharge procedure for a battery or even a whole replacement of a cardiac pacemaker by a new one due to an empty battery.

According to the invention, sensing of the amplitude of the cellular electrical activity and energy harvesting happen together on a microneedle. If a cellular electrical activity above the reference level is detected, harvesting of electrical energy starts. In one embodiment of the invention, harvesting is carried out with repeated charging cycles until the cellular electrical activity falls below the reference level. Which means the microneedle harvests cellular electrical energy multiple times throughout a singular cardiac cycle. In this embodiment the time interval for energy harvesting depends on the heart rate and is approximately between 150 ms and 300 ms. In a further embodiment of the invention harvesting is carried out until a programmable time-out is reached. In this case the programmable time-out could be between 200 ms and 300 ms.

Pacing

According to the invention, every microneedle of the array of microneedles is adapted to be able to emit an electrical pulse. The electrical pulse is suited to electrically stimulate live tissue. According to the invention, every microneedle of the array of microneedles is able to emit a monophasic or a biphasic pulse in the tissue. The voltages of the electrical pulse typically range from 100 mV to 2 V and the pulse lengths varies from 0.2 ms to 2.0 ms. If it is a bipolar pulse the voltages of the electrical pulse typically range from 100 mV to 2 V and −100 mV and 2 V. According to the invention the electrical pulse is generated utilizing the harvested energy. Emitting of an electrical pulse is controlled by the sequence control circuit on the chip.

After an electrical pulse is applied, a new heartbeat is initiated. Starting from the location in the heart, where the pulse is applied through the microneedle of the array of microneedles, the electrical activation and subsequent contraction propagates through the entire heart autonomously. No further pulse or action is required, once the pulse voltage exceeds the energy needed to activate the tissue.

As already described, in principal each microneedle of the array of microneedles is able to emit an electrical pulse. In a preferred embodiment of the invention one microneedle of the array of microneedles is selected to emit an electrical pulse if necessary. The respective microneedle of the array of microneedles is selected via the external programmer unit.

In one embodiment of the invention, the functionality to emit an electrical pulse is programmable for each microneedle of the array of microneedles. An algorithm-based comparison of stimulation thresholds selects the microneedle of the array of microneedles with the lowest stimulation threshold. Advantageously, by utilizing the microneedle of the array of microneedles having the lowest stimulation threshold minimizes the voltage of the electrical pulse emitted, which minimizes the energy consumption of the cardiac pacemaker.

While every microneedle is able to harvest cellular energy, to electrically stimulate live tissue and to sense intrinsic cellular electrical activity, the microneedles are not programmed to perform all three functionalities at the same time. Sensing of cellular electrical activity and harvesting of cellular energy is performed at one microneedle at the same time as already described. In one embodiment of the invention, sensing of cellular electrical energy and emitting an electrical pulse is done at the same microneedle of the array of microneedles. In a preferred embodiment of the invention at least one of the microneedles of the array of microneedles senses the cellular electrical activity and harvests cellular energy and at least one of the microneedles of the array of microneedles is used for emitting an electrical pulse if needed.

In one embodiment of the invention at least one microneedle of the array of microneedles used to emit an electrical pulse is set by programming during implantation of the cardiac pacemaker by the external programmer unit. In a further embodiment of the invention, at least one microneedle of the array of microneedles used to emit an electrical pulse is set by programming any time after the implantation by the external programmer unit.

In a preferred embodiment those microneedle or microneedles of the array of microneedles are selected to emit an electrical pulse if needed which has/have the lowest pace-threshold. Every microneedle of the array of microneedles has its own pace-threshold. The pace-threshold is defined as the energy needed to activate the tissue. Pace-thresholds are defined by the external programmer unit based on the sensed amplitude of the cellular electrical activity. This is performed automatically on the chip or by the external programmer unit.

In one embodiment the cardiac pacemaker is adapted to undertake an algorithm based combination and/or comparison of sensed cellular electrical activity from multiple microneedles, which is done by the external programmer unit. This is useful to assess an automatic reference level and pace-threshold or for an automatized optimization of microneedle function adjudication.

Due to the heart activity during one heart cycle the amplitude of the cellular electrical activity reaches the reference level, rises and falls again below the reference level. In case of normal heart activity this process is repeated for every heartbeat. After a certain time after the sensed amplitude of the cellular electrical activity has exceeded the reference level and has been fallen again below the reference level it is expected that the sensed amplitude of cellular electrical activity exceeds again the reference level due to the next cardiac event.

According to the invention, if the cellular electrical activity exceeds the reference level within a cardiac event, a time window starts, which is called cardiac cycle time. It is expected that inside a given cardiac cycle time the sensed cellular electrical activity falls below the reference levels and rises again until it exceeds the reference level due to the start of the following cardiac cycle. If no cellular electrical activity is sensed above the reference level on all microneedles of the array of microneedles, which is above the respective reference level of the microneedles of the array of microneedles, an electrical pulse is emitted into the tissue at the end of the cardiac cycle time. According to the invention the cardiac cycle time is between 4000 ms and 1500 ms, preferably the cardiac cycle time is 1000 ms. The cardiac cycle time is set via the external programmer unit after implantation of the cardiac pacemaker and can be adjusted any time via the external programmer unit.

The cardiac cycle time starts over again every time the sensed amplitude of the cellular electrical activity reaches the reference level and rises further. Further, the cardiac cycle time starts over again after emitting an electrical pulse into the myocardial tissue. With the cardiac cycle time it is monitored if cardiac events appear in the expected time windows.

As already described the heart beat increases upon physical activity. Thus the cardiac cycle length should be decreased if the patient is physically active. In one embodiment of the invention, physical activity of a patient is detected by a sensor and the sensor gives the command to the chip to set the cardiac cycle length to a minimum cardiac cycle length. Therefore, a minimum cardiac cycle length is defined which is programmable to the chip via the external programmer unit. In one embodiment the minimum cardiac cycle length is between 400 ms and 650 ms. Preferably the minimum cardiac cycle length is set via the external programmer unit.

According to the invention, the cardiac pacemaker comprises safety features. In one embodiment of the invention no electrical pulse is emitted as long as at least one of the microneedles of the array of microneedles senses a cellular electrical activity above the reference level of the corresponding microneedle of the array of microneedles. Thereby, it is omitted that an electrical pulse is emitted into an active heartbeat.

Further in one embodiment of the invention a safety margin is comprised which starts after the cellular electrical activity falls below the reference level. During the safety margin no electrical pulse is emitted. The safety margin is between 50 ms and 100 ms and guarantees that no electrical pulse is emitted in the vulnerable period, in which heart rhythm disturbances can be induced.

However, in case of cardiac cycles in which less than 10% of all microneedles of the array of microneedles sense cellular electrical activity with an amplitude less than 10% above reference level uncertainty arises, whether there is true cellular electrical activity or e.g. if the signals are artifacts or arise from misleading external fields. To prevent a failing heartbeat in such cases, in one embodiment of the invention an electrical pulse is emitted 100 ms after the reference level of the cellular electrical activity was reached if the above mentioned conditions are fulfilled. This can be programmed by the external programmer unit to adapt the safety feature to individual patient's needs.

Advantageously, in a preferred embodiment, a microneedle of the array of microneedles which is programmed to emit an electrical pulse if needed, can also sense cellular electrical activity and harvest energy in a cardiac cycle, when there is cellular electrical activity.

The cardiac pacemaker, according to the invention, provides several advantages, a number of which have already been described. Further, the cardiac pacemaker of the present invention has no wires which connect the cardiac pacemaker with the heart to serve as sensors for the cellular electrical activity or which serve to emit an electrical pulse to the tissue if necessary. These functions are all provided by the microneedles of the array of microneedles. All disadvantages associated with wires are omitted (e.g wires are ingrown by connective tissue).

Each of the microneedles of the array of microneedles represents a separate electrical connection into a cardiac tissue if the cardiac pacemaker is implanted in a patient, wherein each of the microneedles of the array of microneedles is individually programmable by the external programmer unit. Thereby, the cardiac pacemaker comprises more electrical connections into a cardiac tissue than any other device available today. Accordingly, a redundancy of electrical connections is provided by the cardiac pacemaker according to the invention. In contrast, state of the art cardiac pacemakers have only one electrical connection, in form of a wire. If that fails due to electrode problems or degradation of the electrical electrode/tissue interface (e.g. through aging and fibrosis), patients need an operation and a new wire.

The redundancy of the microneedles ensures continuous cardiac pacemaker functionality even in case of degeneration of a single microneedle/tissue interface. If one microneedle degrades over time for whatever reason its function can be taken over by another microneedle of the array of microneedles with a better functionality. Advantageously, the microneedles functionality of every microneedle of the array of microneedles can be exchanged or replaced though configuration reprogramming throughout the entire device lifetime.

Further, due to the improved programmability of sensing and pacing due by programming options the energy consumption of the cardiac pacemaker according to the invention is less compared to the energy consumption of cardiac pacemaker of the state of the art.

The cardiac pacemaker according to the invention provides an improved interpretability of electrical signals in the heart due to instant comparison of hundreds of independent electrical recordings. Moreover, an improved automatized threshold testing due to comparability of signals between neighboring microneedles of the array of microneedles is provided, where one is stimulating and the other one recording. Further, more targeted selection of cardiac pacing sites, e.g. pacing into the specific conduction system (His bundle pacing) is provided due to the availability of multiple anatomically redundant different spatial pacing locations.

Method for Stimulating Myocardial Tissue

Further, the present invention provides a method for stimulating myocardial tissue utilizing a cardiac pacemaker according to any of claims 1 to 10, characterized in that
- the microneedles (10) of the array of microneedles (10) are inserted into myocardial tissue;
- a cardiac cycle time is set;
- optionally a minimum cardiac cycle time is set;
- at least one reference level for the cellular electrical activity is set;
- at least one microneedle (10) of the array of microneedles (10) is set to emit an electrical pulse;

at least one microneedle (10) of the array of microneedles (10) is set to sense the amplitude of the cellular electrical activity and to harvest energy;

the amplitude of the cellular electrical activity is sensed and energy is harvested at least by one microneedle (10);

the cardiac cycle time starts if the amplitude of the cellular electrical activity sensed by at least one microneedle (10) of the array of microneedles reaches the reference level of the corresponding microneedle (10) of the array of microneedles or after a pulse is emitted into the myocardial tissue by at least one microneedle (10) of the array of microneedles; and an electrical pulse is applied to the myocardial tissue by at least one microneedle (10) of the array of microneedles if no cellular electrical activity with an amplitude above the reference level is sensed anymore during the cardiac cycle time after the amplitude of the sensed cellular electrical activity has been fallen below the reference level;

wherein the electrical pulse is generated utilizing the harvested energy.

All features described for the cardiac pacemaker apply also for the method of the present invention and vice versa.

According to the method of the invention the distal ends of the microneedles of the array of a multiple of microneedles are inserted into myocardial tissue. The penetration depth of the microneedles of the array of microneedles is between 1 mm and 1.5 mm. Advantageously the cardiac pacemaker is fixated by fixation devices through the fixation holes in the interposer layer which are outside the lid.

In one embodiment of the invention the cardiac pacemaker is deployed through a catheter, which is advanced from a femoral venous puncture site into the heart.

According to the invention, a cardiac cycle length, optionally a minimum cardiac cycle length and a reference level for the cellular electrical activity are set by the external programmer unit. Further, at least one microneedle of the array of microneedles is set to emit an electrical pulse and at least one microneedle of the array of microneedles is set to sense cellular electrical activity and to harvest energy. This is also done via the external programmer unit. These steps can be done immediately after the implantation of the cardiac pacemaker. Advantageously, adjustments of these parameters can be done any time via the external programmer unit.

Preferably, a minimum cardiac cycle length is set if the cardiac pacemaker according to the invention comprises at least one sensor, wherein the sensor is an activity sensor.

According to the method, the amplitude of the cellular electrical energy is sensed and energy is harvested at least by one microneedle of the array of microneedles. The harvested energy is collected into the at least one buffer capacitor. In one embodiment of the invention the harvested energy is collected into multiple buffer capacitors, wherein the multiple buffer capacitors constitute a buffer capacitors-array.

Further, an electrical pulse is applied to the myocardial tissue by at least one microneedle of the array of microneedles if no cellular electrical activity is sensed anymore during the cardiac cycle time with an amplitude above the reference level after the sensed amplitude of the cellular electrical activity has been fallen below the reference level once. Preferably, the electrical pulse is applied to the myocardial tissue by the microneedle of the array of microneedles having the lowest energy demand. The microneedle of the array of microneedles with the lowest energy demand is determined by the amplitude of the cellular electrical energy sensed by the microneedles of the array of microneedles.

In a further embodiment of the invention several microneedles of the array of microneedles are set to emit an electrical pulse. In one embodiment between 1 and 40 microneedles of 100 microneedles, preferably between 1 and 30 microneedles of 100 microneedles, most preferably 1 microneedle of 100 microneedles is set to emit an electrical pulse.

In one embodiment more than one microneedle is set to sense and harvest cellular electrical energy. Accordingly, in one embodiment all microneedles which are not set to emit an electrical pulse are set to sense and harvest cellular electrical energy.

The electrical pulse which is applied to the myocardial tissue is a monophasic pulse or a biphasic pulse. Both are commonly used in cardiac pacemakers.

In one embodiment of the invention the motion of a patient wearing the cardiac pacemaker is sensed by a sensor. These information can be used to adjust the cardiac cycle time of the cardiac pacemaker to the metabolic needs associated with the physical activity of a patient. This is done by setting the cardiac cycle time to the minimum cardiac cycle time. Accordingly, an electrical pulse is applied to the myocardial tissue by at least one microneedle of the array of microneedles if no cellular electrical activity is sensed anymore during the minimum cardiac cycle time with an amplitude above the reference level after the sensed amplitude of the cellular electrical activity has been fallen below the reference level once.

BRIEF DESCRIPTION OF THE DRAWINGS

The invention is further described by 9 figures and 2 example.

FIG. 5 illustrates harvesting during a cardiac event;

FIG. 6 illustrates harvesting, sensing and emitting of a pulse during successive cardiac events;

FIG. 7 illustrates different electrical pulses;

DETAILED DESCRIPTION

Figure 1:
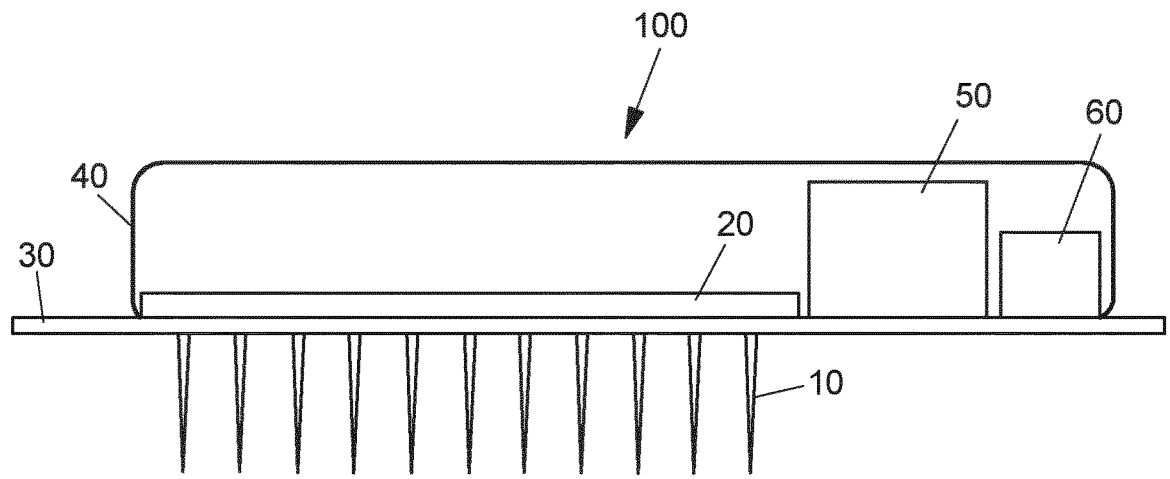
FIG. 1 illustrates one embodiment of the cardiac pacemaker according to the invention in side view.

FIG. 1 illustrates one embodiment of the cardiac pacemaker 100 according to the invention in side view. On top of the interposer layer 30 the chip 20, a sensor 50 and a capacitor 60 are positioned. Furthermore, a coil is positioned on top of the interposer layer 30, which is not shown in the figure for the sake of clarity. The chip 20, the sensor 50, the capacitor 60 and the coil are covered by lid 40. The lid 40 covers the chip 20, the sensor 50 and the capacitor 60 from the surrounding, wherein the lid 40 is sealed to the interposer layer 30. Sealing can be done by adhesives or soldering tin. If adhesives are used the adhesive should be hardened. However, the sealing should be bio-compatible and insensitive to body fluids. Accordingly, the lid 40 and the interposer layer 30 form a capsule for the chip 20, the sensor 50 and the capacitor 60. The lid 40 and the interposer-layer 30 shield the electronic parts from surrounding body-fluids like blood, e.g. from body fluids by forming a capsule. The proximal end of each microneedle 10 is soldered to the surface of the chip 20, which ensures that each microneedle 10 of the array of a multiple of microneedles has a direct contact to the chip 20. According to the invention each microneedle 10 of the array of a multiple of microneedles is isolated from each other microneedle 10 of the array of a multiple of microneedles. Further, the distal end of every microneedle 10 protrudes from the chip 20 and the interposer layer 30.

Figure 2:
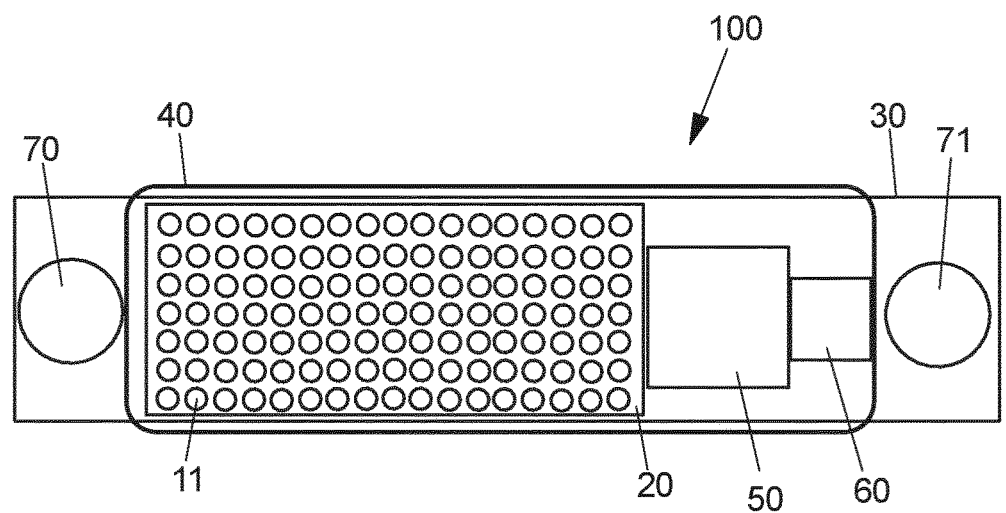
FIG. 2 illustrates one embodiment of the cardiac pacemaker according to the invention in top view.

FIG. 2 illustrates one embodiment of the cardiac pacemaker 100 according to the invention in top view. Again, the chip 20, the sensor 50, the capacitor 60 and the coil are positioned on the interposer layer 30 and covered by the lid 40. The proximal end of each microneedle 10 is soldered by soldering points 11 to the surface of the chip 20, which ensures that each microneedle 10 of the array of a multiple of microneedles has a direct contact to the chip 20. Further the interposer layer 30 comprises two fixing holes 70, 71. Those fixing holes 70, 71 are positioned outside the lid 40 on each side of the lid 40 in the interposer layer 30. The fixing holes 70, 71 are suited to serve for the fixation of the cardiac pacemaker 100 into myocardial tissue. The cardiac pacemaker 100 can be fixated by screws, clamps or such like devices through the fixing holes 70, 71 in the interposer layer 30.

Figure 3:
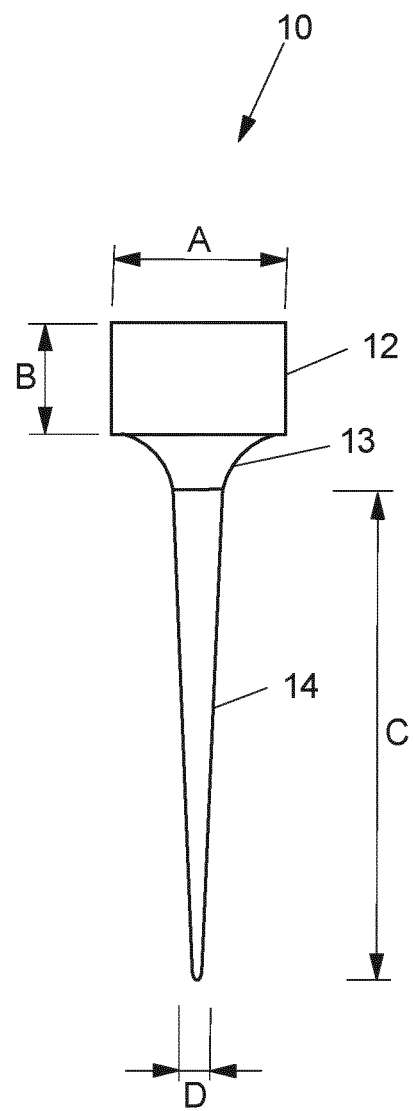
FIG. 3 illustrates one embodiment of a microneedle of the array of microneedles.

FIG. 3 illustrates one embodiment of a microneedle 10 of the array of microneedles. The microneedle 10 comprises a proximal end 12, a tapered portion 13 and a distal end 14, wherein the tapered portion 13 connects the proximal end 12 with the distal end 14. Accordingly the tapered portion 13 is as short as possible and serves only as connection between the proximal end 12 and the distal end 14. In one embodiment of the invention, the microneedle 10 according to the invention has a proximal end 12, which is shaped cylindrical with a diameter A between 0.05 mm and 0.5 mm, preferably the proximal end has a diameter A of 0.2 mm and a height B between 0.05 mm and 0.5 mm, preferably with a height B of 0.2 mm. The distal end 14 is needle shaped and has a length C between 0.5 mm and 2.0 mm. The distal end 14 of the microneedle 10 is electrically conductive and shear stress resistant in the range of 5 to 50 Newton, which is comparable to the shear stress resistance of bonding wires. Preferably the microneedle is milled from one piece. Preferably, the diameter D of the distal end 14 of the microneedle is between 0.001 mm and 0.1 mm, preferably between 0.01 mm and 0.1 mm, most preferably the diameters D of the distal end 14 of the microneedle is 0.02 mm. Thereby, the distal end 14 of the microneedle 10 approximates myocardial cellular dimensions.

Figure 4:
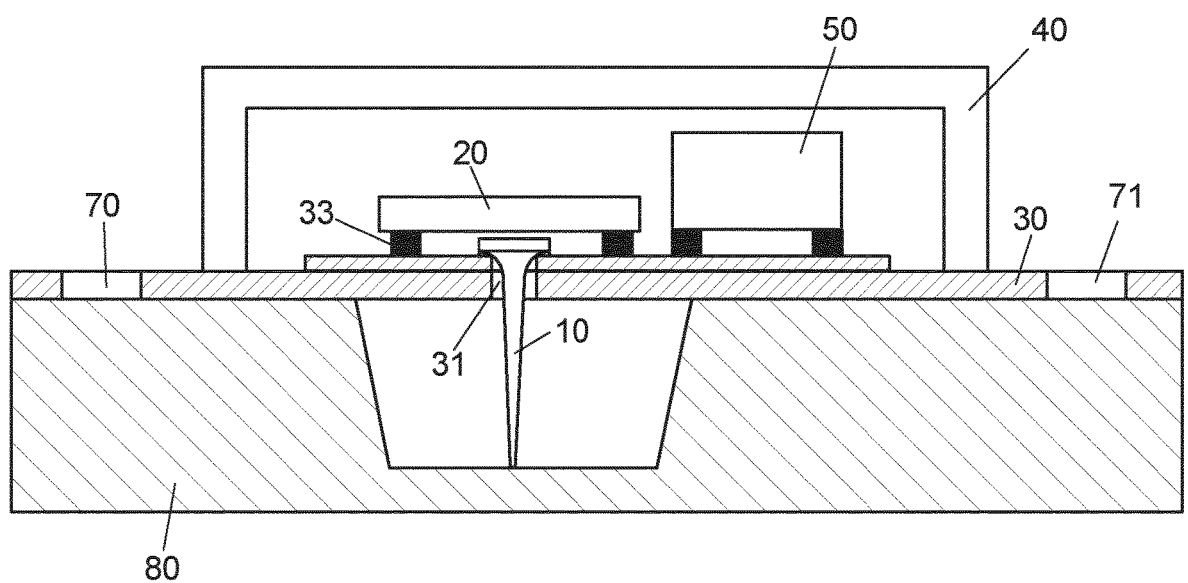
FIG. 4 illustrates an embodiment of the cardiac pacemaker.

FIG. 4 illustrates one embodiment of the cardiac pacemaker 100. An interposer layer 30 is provided which is adapted to connect the microneedles 10 of the array of microneedles with the chip 20. Further, the interposer layer 30 comprises holes 31 which are suited for receiving a microneedle 10. Moreover, the interposer layer 30 comprises two fixation holes 70, 71. The interposer layer is covered by a temporary protective cover 80, which forms a sacrificial layer which is removed after assembly. A microneedle 10 is put inside the hole 31. The chip 20 is soldered to the interposer layer 30 by soldering points 33. A sensor 50 is additionally positioned on the interposer layer 30. Furthermore a further capacitor 60 and a coil are positioned on the interposer layer 30, which are not shown in the figure for the sake of clarity. The lid 40 is mounted to seal the device.

FIG. 5 illustrates the timing of the harvesting during a cardiac event. The graph illustrates the amplitude of the cellular electrical activity over time during one cardiac event as sensed over a singular microneedle 10 of the array of microneedles. As the amplitude of the cellular electrical activity reaches the reference level $U_1$ of the corresponding microneedle the cardiac cycle time $t_1$ starts and harvesting cycles 400 are started. Energy harvesting is done until the amplitude of the cellular electrical activity falls below the reference level $U_1$ again, which is at time point $t_2$.

FIG. 6 illustrates harvesting, sensing and emitting of a pulse during successive cardiac events. The first cardiac event is sensed and harvesting of energy starts at $t_1$ when the reference level $U_1$ of the corresponding microneedle is reached. At $t_1$ the cardiac cycle time starts which is set to 1000 ms. The second cardiac event starts and the reference level is reached by the amplitude of the sensed cellular electrical activity at time $t_2$. The time difference $t_2-t_1$ is smaller than 1000 ms, therefore no pulse is emitted by the cardiac pacemaker. At $t_2$ the cardiac cycle time starts over again. During the second cardiac event again energy harvesting is done. After the second cardiac cycle a malfunction of the heart appears. Therefore, no cellular electrical activity can be sensed by the microneedle until the cardiac cycle time starting at $t_2$ has expired. The time difference $t_3-t_2$ equals 1000 ms and according to the invention, at $t_3$ a pulse is emitted to the myocardial tissue. After emitting a pulse, in this case a bipolar pulse the cardiac cycle time starts over again at the time point $t_3$. The heartbeat stabilizes again, a new cardiac cycle starts and at $t_4$ the reference level is reached by the amplitude of the cellular electrical energy. The time difference $t_4-t_3$ is smaller than 1000 ms and therefore smaller compared to the cardiac cycle time. $\Delta t_{SM}$ illustrates the safety margin. During the safety margin no electrical pulse is emitted.

The safety margin is between 50 ms and 100 ms and guarantees that no electrical pulse is emitted in the vulnerable period, in which heart rhythm disturbances can be induced.

FIG. 7 illustrates different electrical pulses. According to the invention monophasic pulses 500 as well as bipolar pulses 600 can be emitted by the microneedles 10.

Figure 8:
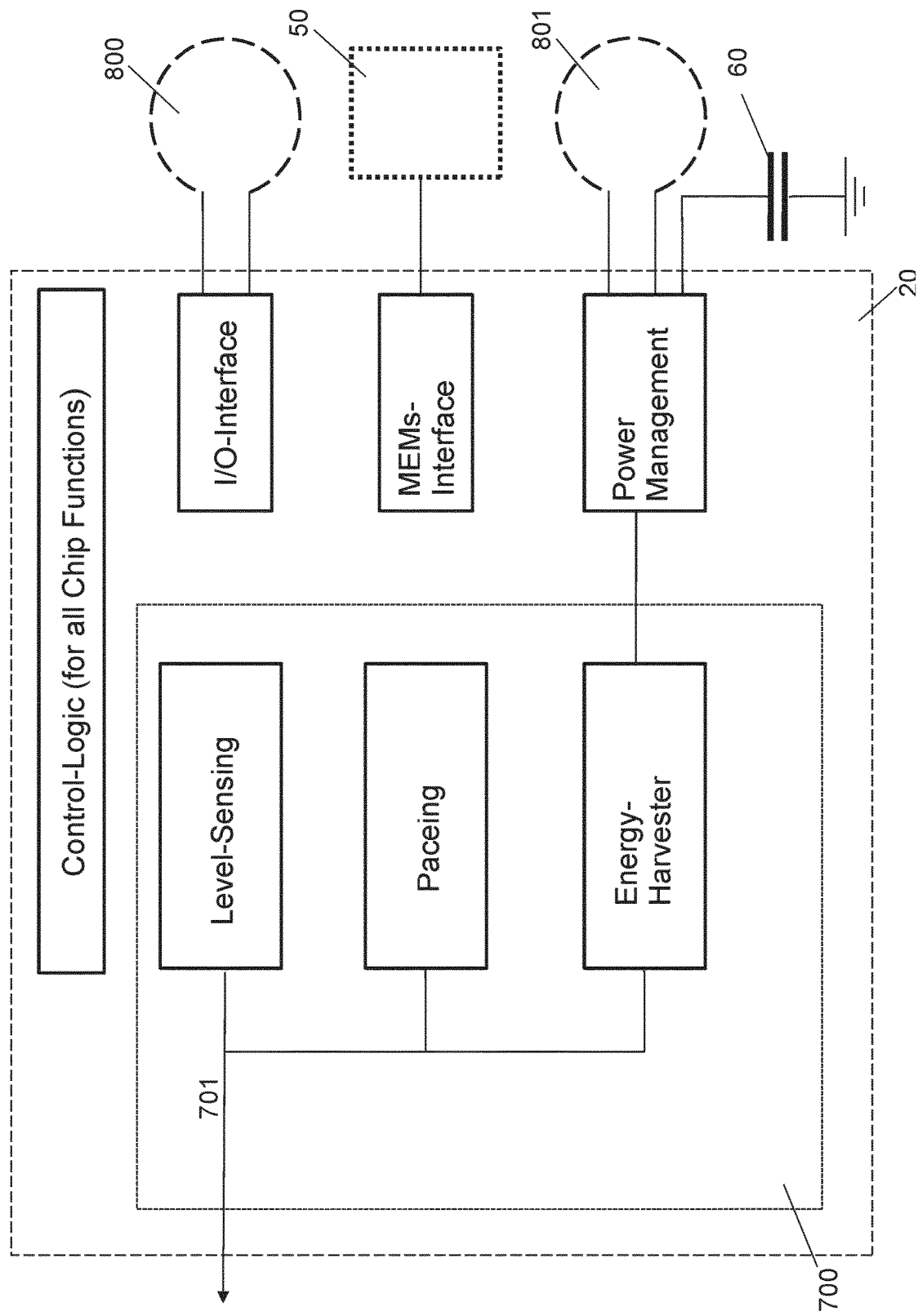
FIG. 8 illustrates the functions of the cardiac pacemaker.

FIG. 8 illustrates the functions of the cardiac pacemaker 100. Chip 20, external capacitor 60, coil 800 working as an antenna, coil 801 used for power transmission and the sensor 50 which is an activity sensor are illustrated. The sensor 50 is typically an accelerometer. Although the microneedles 10 are not illustrated in the scheme, box 700 illustrates the basic functions of the microneedles 10. Box 700 with the connection 701 to a microneedle, level sensing-function, pacing-function and energy harvesting function is repeated for every microneedle of the cardiac pacemaker, which means, typically over 100 times. For each microneedle 10 the three basic function (sensing, pacing and harvesting) are associated. Control-logic and programming, which are the sequence control circuit, determine which function is activated per microneedle 10, bringing a great deal of redundancy to the system.

Control-logic and several further functions are implemented within the chip 20. The power management interface receives power from the harvesters and also from an associated coil 801 which can be fed from an electromagnetic field, which is applied from the external programmer unit for startup. Later operation is assumed from the collected energy harvested from the heart beats and does not require electromagnetic feeding any more. Further, the power management interface connects to the further capacitor 60 of the cardiac pacemaker, thereby receiving power from energy stored in the further capacitor 60.

The I/O-interface also uses a coil 800 for data transmission to the external programmer unit. It is conceivable that one coil 800, 801 alone can assume both functions: energy transport and data transport.

The MEMS-interface serves as sensor interface and connects to an external activity sensor 50, which is typically a MEMS-device. Typically multi-axis accelerometers are commercially available, but need dedicated controls from this circuit block to operate the MEMS-device.

Figure 9:
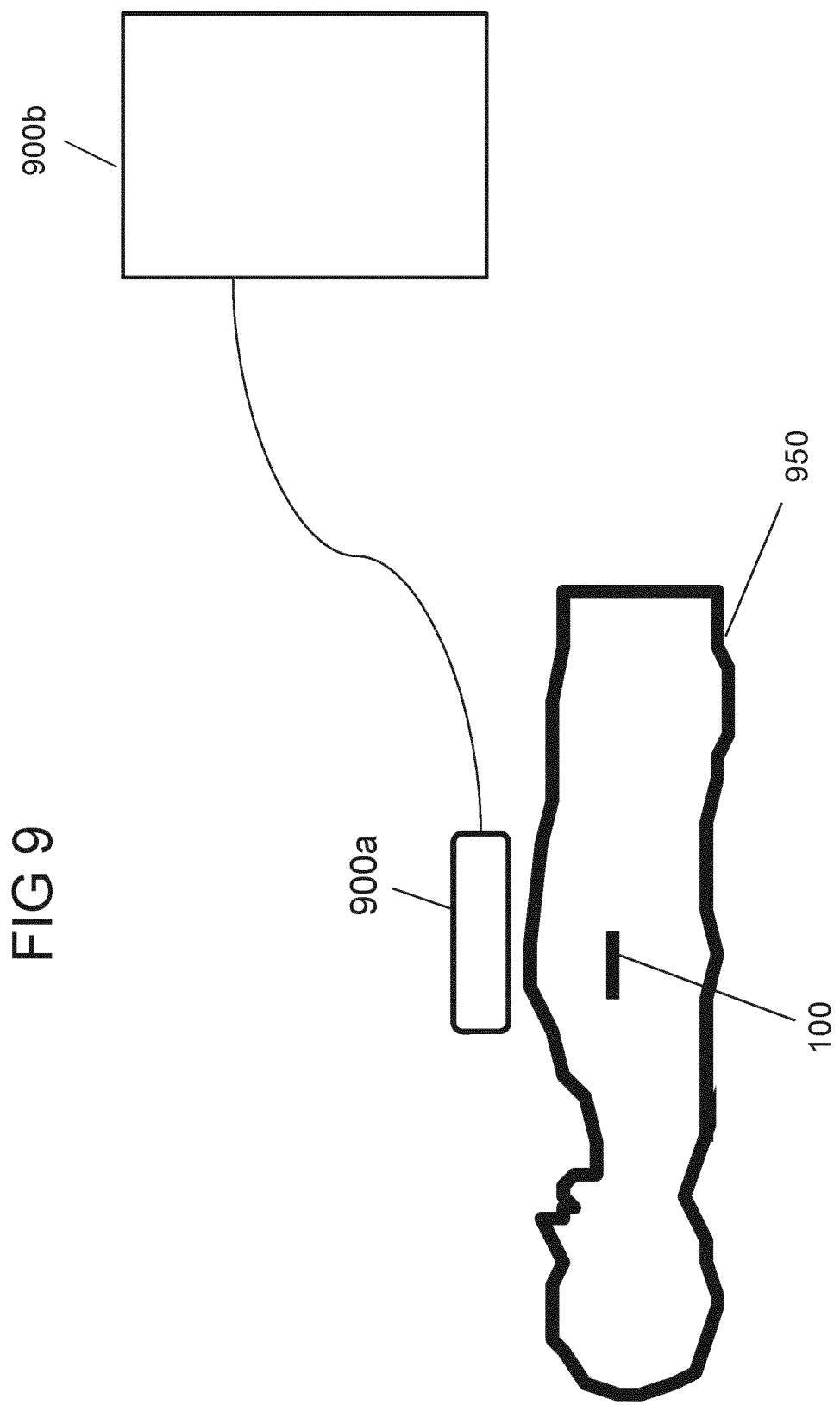
FIG. 9 illustrates the setup at the implant phase.

FIG. 9 the setup at the implant phase. The patient 950 receives the implanted cardiac pacemaker 100 which is subsequently communicating with the part 900*a* of the external programmer unit. Part 900*a* of the external programmer unit prided the power stimulus for startup and also the data-interface to the cardiac pacemaker 100.

On the other side of the part 900*a* of the external programmer unit, is connected to part 900*b* of the external programmer unit which is for example a data-terminal, preferably a PC which runs the software which controls the settings of the cardiac pacemaker 100, evaluates the signals received and also diagnostics. The user surface of the PC provides the necessary controls for the doctors at surgery, but also later in the field for regular control of the patient.

Example 1

A cardiac pacemaker 100 according to the invention was build comprising an array of 7×17 microneedles 10 which are soldered to a chip 20 with a size of 3×7 mm and a height of 0.3 mm. The chip 20 with the array of microneedles was soldered to an interposer layer 30 with a size 4 mm×15 mm. Next to the chip 20 a sensor 50 was positioned with a dimension of 2×2 mm and a height of 1 mm. Next to the sensor 50 a capacitor 60 was positioned on the interposer layer 30 with a dimension of 1×1 mm and a height of 1 mm. The chip 20, the sensor 50 and the capacitor 60 were covered by a lid 40, wherein the lid had a size of 4 mm×12 mm and the thickness of the lid-material was between 0.1 mm and 0.5 mm. Further, the interposer layer 30 comprises on each side of the lid 40 a fixation hole 70, 71. Each fixation hole 70, 71 had a diameter of 1.5 mm.

Example 2

An array of microneedles 10 was used in a cardiac pacemaker according to the invention, wherein each microneedle 10 had the following shape. Each microneedle 10 comprises a proximal end 12, a tapered portion 13 and a distal end 14, wherein the tapered portion 13 connects the proximal end 12 with the distal end 14. Accordingly, the tapered portion 13 is as short as possible and serves only as connection between the proximal end 12 and the distal end 14. The proximal end 12 was shaped cylindrical with a diameter A of 0.2 mm and a height B of 0.2 mm. The distal end 14 was needle shaped and had a length C of 1.5 mm. The diameter D of the distal end 14 of the microneedle was 0.02 mm. Thereby, the distal end 14 of the microneedle 10 approximates myocardial cellular dimensions.

REFERENCE LIST 10 microneedle
11 soldering point
12 proximal end
13 tapered portion
14 distal end
20 chip
21 wire
30 interposer layer
31 hole
33 soldering point
40 lid
50 sensor
100 capacitor
70, 71 fixing hole
80 protective cover
100 cardiac pacemaker
400 harvesting cycle
500 monophasic pulse
600 bipolar pulse
700 basic functions
701 connection to microneedle
800 coil
801 coil
900*a*, 900*b* external programmer unit
950 patient

The invention claimed is:

1. A cardiac pacemaker (100), characterized in that the cardiac pacemaker (100) comprises a multiple of microneedles (10) forming an array of microneedles (10);
a chip (20) comprising at least one comparator with adaptive level, a sequence control circuit, at least one capacitor stack built by n capacitors and 2n switches, at least one buffer capacitor outside the at least one capacitor stack, at least two additional switches outside the at least one capacitor stack and a CMOS-Logic, wherein n∈N;
an interposer layer (30) comprising holes (31) for the multiple of microneedles (10); a lid (40);
at least one coil (800);
wherein the chip (20), is located on one surface of the interposer layer (30); wherein the lid (40) and the interposer layer (30) form a capsule for the chip (20) and the at least one coil (800);
wherein each microneedle (10) has a distal end which protrudes from the chip (20); and
wherein the cardiac pacemaker (100) is adapted to be electrically self-sufficient due to harvesting of electrical energy from myocardial cells.

2. The cardiac pacemaker (100) according to claim 1, characterized in that the cardiac pacemaker (100) further comprises at least one sensor (50) and at least one further capacitor (60).

3. The cardiac pacemaker (100) according to claim 2, characterized in that the sensor (50) is implemented as a micromechanical (MEMS) activity sensor, an electrostatical accelerometer or a piezoceramic accelerometer.

4. The cardiac pacemaker (100) according to claim 1, characterized in that the cardiac pacemaker (100) comprises 5 to 10000 microneedles (10).

5. The cardiac pacemaker (100) according to claim 1, characterized in that the cardiac pacemaker (100) further comprises an external programmer unit (900*a*, 900*b*).

6. Method for stimulating myocardial tissue utilizing a cardiac pacemaker (100) according to claim 5, characterized in that
the microneedles (10) of the array of microneedles (10) are inserted into myocardial tissue;
a cardiac cycle time is set;
optionally a minimum cardiac cycle time is set;

at least one reference level for a cellular electrical activity is set;

at least one microneedle (10) of the array of microneedles (10) is set to emit an electrical pulse;

at least one microneedle (10) of the array of microneedles (10) is set to sense an amplitude of the cellular electrical activity and to harvest energy;

the amplitude of the cellular electrical activity is sensed and energy is harvested at least by one microneedle (10);

the cardiac cycle time starts if the amplitude of the cellular electrical activity sensed by at least one microneedle (10) of the array of microneedles reaches the reference level of the corresponding microneedle (10) of the array of microneedles or after a pulse is emitted into the myocardial tissue by at least one microneedle (10) of the array of microneedles; and an electrical pulse is applied to the myocardial tissue by at least one microneedle (10) of the array of microneedles if no cellular electrical activity with an amplitude above the reference level is sensed anymore during the cardiac cycle time after the amplitude of the sensed cellular electrical activity has fallen below the reference level; wherein the electrical pulse is generated utilizing the harvested energy.

7. Method according to claim 6, characterized in that an electrical pulse is applied to the myocardial tissue by the microneedle (10) having a lowest energy demand.

8. Method according to claim 6, characterized in that the electrical pulse is a monophasic pulse or a bipolar pulse.

9. Method according to claim 6, characterized in that the harvested energy is collected into the at least one buffer capacitor or a buffer capacitor-array.

10. Method according to claim 6, characterized in that motions of biological tissue are sensed by the sensor (50) and that the cardiac cycle length is set to a minimum cardiac cycle length if motions of the biological tissue are sensed.

11. The cardiac pacemaker (100) according to claim 1, characterized in that every microneedle (10) is adapted to be operable independent of the other microneedles in said array of microneedles (10).

12. The cardiac pacemaker (100) according to claim 1, characterized in that the cardiac pacemaker (100) is about 1 mm and 8 cm long, about 1 mm and 5 mm wide and about 3 mm and 10 mm high.

13. The cardiac pacemaker (100) according to claim 1, characterized in that diameters of distal ends (14) of the microneedles are about 0.001 mm to about 0.1 mm.

14. The cardiac pacemaker (100) according to claim 13 characterized in that the microneedles have a distal end diameter of about 0.01 mm to about 0.1 mm.

15. The cardiac pacemaker (100) according to claim 13 characterized in that the microneedles have a distal end diameter of about 0.02 mm.

16. The cardiac pacemaker (100) according to claim 1, characterized in that the microneedles (10) comprise a material from a group consisting of Platinum/Iridium (PtIr), gold, and fine metals.

17. The cardiac pacemaker (100) according to claim 1, characterized in that each microneedle (10) is adapted to be able to harvest cellular energy, to electrically stimulate live tissue and to sense intrinsic cellular electrical activity.

18. The cardiac pacemaker (100) according to claim 1, characterized in that the interposer layer (30) further comprises at least two fixation holes (70, 71) outside the lid (40).

19. The cardiac pacemaker (100) according to claim 1 characterized in that the cardiac pacemaker (100) comprises 25 to 1,000 microneedles (10).

20. The cardiac pacemaker (100) according to claim 1 characterized in that the cardiac pacemaker (100) comprises 100 to 250 microneedles (10).

* * * * *